United States Patent [19]
Krumme et al.

[11] Patent Number: 5,395,193
[45] Date of Patent: Mar. 7, 1995

[54] OPTIMIZED ELASTIC BELLEVILLE FASTENER USEFUL IN EYEGLASS FRAMES

[75] Inventors: John F. Krumme, Tahoe City; William H. Humphries, Sr., Patterson; Thomas W. Duerig, Fremont; Michael D. Perry, Woodside, all of Calif.

[73] Assignee: The Beta Group, Menlo Park, Calif.

[21] Appl. No.: 35,627

[22] Filed: Mar. 23, 1993

[51] Int. Cl.⁶ .................. F16B 21/00; F16B 21/18; B23P 11/02
[52] U.S. Cl. .................. 411/339; 411/353; 411/521; 411/909; 29/20; 29/525.1
[58] Field of Search ............... 411/338, 339, 521, 525, 411/526, 533, 909, 353; 29/20, 436, 525.1, 525.2

[56] References Cited

U.S. PATENT DOCUMENTS

| | | | |
|---|---|---|---|
| 2,230,916 | 2/1941 | Tinnerman | 411/525 |
| 3,203,302 | 8/1965 | Frederick . | |
| 3,367,228 | 2/1968 | King, Jr. | 411/526 X |
| 3,619,478 | 11/1971 | Staiger | 411/909 X |
| 4,450,616 | 5/1984 | Morita | 411/909 X |
| 4,624,092 | 11/1986 | Baginski . | |
| 4,880,343 | 11/1989 | Matsumoto | 411/909 X |
| 5,224,248 | 7/1993 | Brilliant | 29/525.1 |

FOREIGN PATENT DOCUMENTS 4-25607  1/1992  Japan .................. 411/533

*Primary Examiner*—Neill R. Wilson
*Attorney, Agent, or Firm*—Burns, Doane, Swecker & Mathis

[57] ABSTRACT

A fastener useful for attaching components of an eyeglass frame together. The fastener includes a pin having a smooth or fluted shank and a belleville washer having a hole for receiving the shank, the hole being sized to provide an interference fit with the washer. The washer is made from a titanium nickel shape memory alloy in an optimized elastic condition. The optimized elastic condition is provided by work hardening a sheet of Ni-Ti and cutting or stamping the washer out of the sheet. The washer is also plastically deformed into a conical shape.

16 Claims, 2 Drawing Sheets

OPTIMIZED ELASTIC BELLEVILLE FASTENER USEFUL IN EYEGLASS FRAMES

BACKGROUND OF THE INVENTION

1. Field of the Invention

The present invention relates to fasteners used in eyeglass frames for holding lenses into lens frames and temple pieces to the lens frames and hinges.

2. Description of Related Art

Historically small screws have been used to attach various eyeglass frame components together to form a completed frame. Screws specifically are used to attach temple pieces at the hinge to lens frames. They are also used to tension and anchor or lock lenses into lens frames allowing assembly and disassembly for replacement of lens or damaged components or initial shipping of frames with demonstration lenses in place.

In normal use eyeglass frames are subjected to stresses and strains in a cyclical manner that tend to loosen screws and wear the threads with which the screws are mated resulting in temple pieces becoming loose or detached and lenses falling out of their frames.

Various methods to minimize this problem have been tried with limited success. Examples are polymeric compounds often referred to as "locktite" intended to at least slow down the loosening process. This method requires individual coating of the screws which is expensive and provides only limited improvement over uncoated screws eventually succumbing to the same process of loosening. Another example of a method intended to "lock" the screws in place is the use of distorted threads on the screw to create a mechanical jamming action with the mating threads. This method offers only limited improvement again eventually succumbing to the loosening process as well. Both methods make any replacement or disassembly and reassembly process difficult or impossible and do not accommodate wear of the mated components even if no loosening or backing out of the screws occurs.

U.S. Pat. No. 4,896,955 ("the '955 patent"), the subject matter of which is hereby incorporated by reference, discloses an eyeglass frame, of which components are formed from nickel-titanium based shape memory alloys. Components of the frame can be formed from such alloys treated in a variety of ways, to confer desired properties on the component. For example, fastening elements used in the frame can exhibit conventional shaped memory properties of the alloy. Other components of the frame can exhibit the enhanced elastic properties exhibited by shape memory alloys.

A shape memory alloy can exhibit "super elastic" behavior at a temperature below the $M_s$ of the alloy as a result of a significant degree of work-hardening, for example to about 30% or more plastic deformation. By selection of an alloy with an appropriate $M_s$ temperature, with appropriate work-hardening, such behavior can be obtained in a temperature range of $-20°$ C. to $40°$ C.

A shape memory alloy can exhibit "pseudo-elastic" properties. Such properties are exhibited in a narrow temperature range, between the $M_s$ and $M_d$ temperatures of the alloy. They involve transformation of an alloy in its austenite phase to its martensite phase by the application of stress. Application of stress in these conditions can give rise to high strain values. Provided that the temperature is between the $M_s$ and the $M_d$ temperatures of the alloy, virtually all of the strain is recovered. The deformation and recovery are marked by significant deviations from linear elastic behavior.

A shape memory alloy which has been work-hardened, perhaps to 30% or more plastic deformation, and at a temperature between its $M_s$ and $M_d$ temperature, exhibits a combination of superelastic and pseudoelastic behavior known as "optimized elastic" behavior. The optimized elastic behavior is referred to in the '955 patent as "work-hardened pseudoelastic" behavior.

It is advantageous to use shape memory alloys which exhibit enhanced elastic behavior in the manufacture of eyeglass frames, for their kink resistance. Pseudoelastic properties are particularly preferred, because of the large amount of strain which can be recovered. However, a disadvantage of relying on pseudoelastic properties is that they are available only over a narrow temperature range.

This problem was addressed in the '955 patent by subjecting shape memory alloy eyeglass frame components to work-hardening. In this way, the advantages of superelastic behavior, and some of the advantages of pseudoelastic behavior can be obtained from temperatures below the $M_s$ temperature up to the $M_d$ temperature of the selected alloy.

SUMMARY OF THE INVENTION

The invention provides a fastener comprising a pin and a belleville washer. The pin includes a shank and the washer includes a hole therethrough extending between opposite sides of the washer, the hole being sized to provide an interference fit with the shank. In addition, the washer is of a titanium-nickel shape memory alloy in an optimized elastic condition. The optimized elastic behavior provides a degree of tightening heretofore unavailable while minimizing the need for tight tolerances and while compensating for wear of components held together by the fastener.

The pin can include a flange extending radially outwardly from one end of the shank and the other end of the shank can be tapered to facilitate entry in the hole of the washer. The washer can be conical in shape such that the entire conical surface extending between the hole and an outer periphery of the washer is inclined with respect to a normal to a central axis passing through the hole. For instance, the conical surface can be inclined at an angle of at least 10° with respect to the normal to the central axis. The shank can be provided with a smooth or irregular outer surface. For instance, the irregular surface can comprise a plurality of axially spaced-apart indentations extending circumferentially around the shank and the indentations can be concave in axial cross section. The hole is preferably circular and the shank is preferably cylindrical, the hole being sized to have a diameter smaller than a maximum outer diameter of the shank.

According to one feature of the invention, the fastener can be used to hold together components of an eyeglass frame. For instance, the shank of the pin can extend through axially aligned bores in two discrete components of an eyeglass frame such that the washer is press fitted on the shank and prevents the two components of the eyeglass frame from being removed from the pin. Alternatively, in the case where the pin forms part of a component of an eyeglass frame, the shank of the pin can extend through a bore in another component of the eyeglass frame and the washer can be press fitted on the shank to prevent the component from being removed from the pin. The optimized elastic behavior of the washer can be utilized over a temperature range of −20° C. to +40° C., the range of temperatures most eyeglass frames are subjected to when in use.

According to another aspect of the invention, a tool is provided for assembling the fastener. The tool can include a washer supporting surface and a displaceable centering pin which is movable in an axial direction and sized to pass through the hole in the washer. The washer supporting surface surrounds the centering pin and is sized to surround the shank of the pin when the washer is press fitted onto the shank of the pin. The centering pin can be spring mounted in a socket in the tool. The washer support surface can be annular in shape and perpendicular or inclined with respect to the axial direction. Thus, when the tool is used to press fit the washer onto the shank of the pin, the washer support surface can be used to deform the conical washer into a flattened shape with the edge of the washer defining the hole pressing tightly against the shank of the pin. In cases where the washer support surface is inclined (e.g., the washer supporting surface and the washer can both be conical in shape), a different insertion tool having a flat (non-inclined) washer support surface can be used to flatten the washer against a component from which the shank of the pin extends.

The invention also provides a method of attaching the fastener described above. In particular, the method includes inserting the shank of the pin through a bore in a component and pressing the washer onto a free end of the shank such that the washer holds the shank of the pin in the bore of the component. In the case where the washer has a conical surface extending between the hole and the outer periphery of the washer, the washer can be deformed during the pressing step such that the conical surface is substantially flattened and the flattened surface presses against the component. The component can form part of an eyeglass frame and the pin can include a radially outwardly extending flange. The shank can be passed through a bore of a second component of the eyeglass frame during the inserting step and the washer can be pressed onto the shank until the flange presses against the second component during the pressing step.

DETAILED DESCRIPTION OF THE PREFERRED EMBODIMENTS

Figure 1:
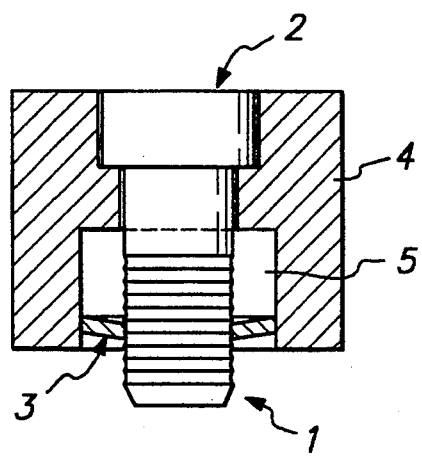
FIG. 1 is a cross-sectional view of a fastener in accordance with the invention.

The invention provides a fastener which can be used to replace threaded screws for eyeglass components with the advantage of eliminating the loosening and wear typical of screws. The fastener according to the invention allows positioning, tensioning and locking with the added advantage of being capable of being disassembled and reassembled at will.

According to one aspect of the invention, the fastener includes a flanged pin and mating "optimized elastic" Ni-Ti based alloy belleville washer. The mating diameters of the pin and hole in the washer are preferably sized to provide an interference fit with the leading end of the pin preferably being tapered to allow alignment and initial entry into the washer. To provide enhanced gripping, the pin can include flutes along the length thereof. However, adequate gripping between the pin and washer can be obtained when the pin is smooth along the length thereof. Through the use of a simple tool, the pin and washer can be adjusted relative to each other to provide a desired tension and/or position. The tool advances the pin into the washer and spring loads the "optimized elastic" Ni-Ti based alloy belleville washer against a part such as a lens frame or hinge component of an eyeglass frame.

As the eyeglass frames are subjected to the usual cyclical stresses and strains in normal use, the extraordinary elasticity of the optimized elastic Ni-Ti alloy belleville washer will maintain a fairly uniform spring loading on the joined components even as wear occurs in the sliding surfaces of the components.

Another simple tool can be used to disassemble the pin/washer combination. The disassembly tool should be capable of pressing the pin out of the washer. For example, by removing the pin, the eyeglass frame components can be separated from each other. Subsequently assembly can be accomplished using the same components or a new pin and washer set by the method noted above.

The fastener according to the invention will now be described with reference to FIGS. 1–9. In particular, the invention provides a fastener 1 including a pin 2 and washer 3, as shown in the assembled condition in FIG. 1. According to a preferred embodiment of the invention, the pin 2 and washer 3 can be used to hold a first component 4 and a second component 5 of an eyeglass frame together. Further, the washer 3 preferably has the conical shape shown in FIG. 1 and the washer 3 can be pressed against the component 5 such that the washer 3 either maintains the conical shape or is flattened completely against the component 5.

Figure 2:
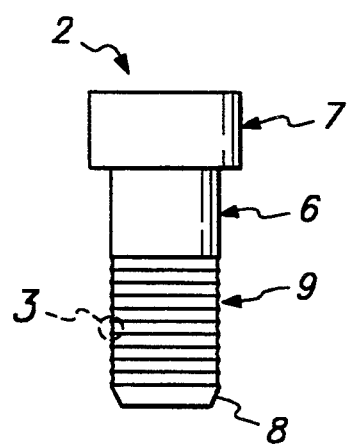
FIG. 2 is a perspective view of a pin which can be used as part of the fastener in accordance with the invention.
Figure 3:
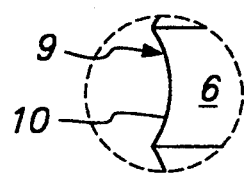
FIG. 3 is a detail drawing showing a fluted surface on the pin shown in FIG. 2.
Figure 4:
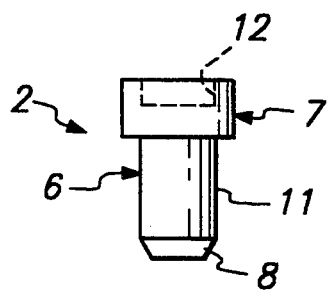
FIG. 4 is a perspective view of another pin which can be used in accordance with the invention.
Figure 5:
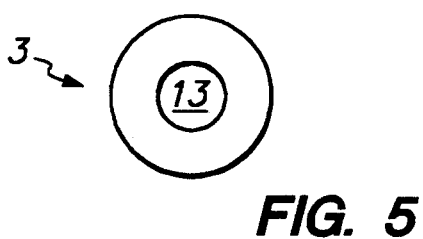
FIG. 5 shows a top view of a belleville washer in its as manufactured condition which can be used as part of the fastener in accordance with the invention.

As shown in FIG. 2, the pin 2 includes a shank 6 and the pin 2 can include a tapered end 8 and a radially outwardly extending flange 7. If desired, the outer surface of the shank 6 can have an irregular surface 9. FIG. 3 is a detail of the irregular surface shown in FIG. 2. As shown in FIG. 2, the irregular surface 9 can comprise a plurality of axially spaced-apart indentations 10 extending circumferentially around the shank. As shown in FIG. 3, the indentations can be convex in axial cross-section. Alternatively, the shank 6 can have a smooth surface 11, as shown in FIG. 4. In addition, the flange 7 can optionally include a slot or socket 12 to facilitate mounting of the pin 2 on a tool used for inserting the pin 2 in a bore through a component.

Figure 6:
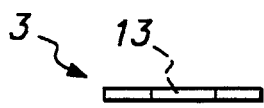
FIG. 6 shows a side view of the washer shown in FIG. 5.
Figure 7:
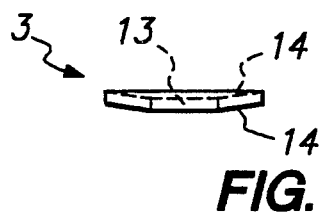
FIG. 7 shows a side view of the washer shown in FIG. 6 subsequent to a shaping step wherein the washer is given a conical shape.

The washer 3 includes a hole 13 having a diameter smaller than an outer diameter of the shank 6. When the washer 3 is press fitted onto the shank 6, the edge of the washer 3 defining the hole 13 is elastically deformed such that it is expanded and tightly grips the outer surface of the shank 6. The washer is made from a titanium-nickel based shape memory alloy in an optimized elastic condition. The optimized elastic condition can be provided by work hardening a sheet of Ni-Ti at temperatures between the $M_s$ and $M_d$ of the alloy. Subsequently, the washer 3 can be stamped or cut out of the sheet, the hole 13 can be stamped in the washer 3 and the washer 3 can be deformed from the flattened condition shown in FIG. 6 to the conical shape shown in FIG. 7. As shown in FIG. 7, the washer 3 includes a conical surface extending between the hole 13 and the outer periphery of the washer 3. The conical surface 14 forms an angle with a normal to a central axis of the hole 13. The angle is preferably greater than 10° and more preferably ranges from 15° to 30°.

Figure 8:
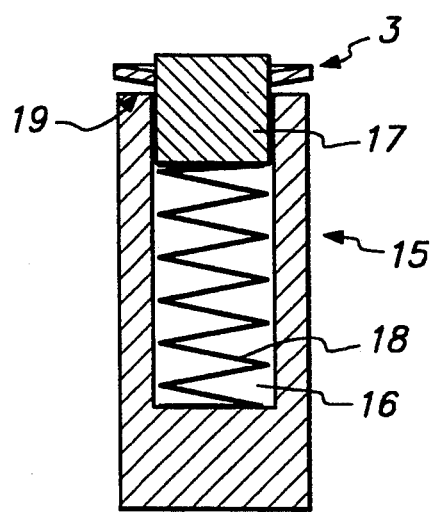
FIG. 8 is a schematic drawing of an installation tool for assembly of fastener of the invention.

FIG. 8 shows an insertion tool 15 for press fitting the washer 3 onto the shank 6 of the pin 2. The tool 15 includes a displaceable centering pin 17 movable in an axial direction and sized to pass through the hole 13 in the washer 3. The centering pin 17 can be mounted on a spring 18 and the spring 18 and centering pin 17 can be located in a socket 16 of the tool 15. The tool also includes a washer supporting surface 19 which surrounds the centering pin 17 and is sized to surround the shank 6 of the pin 2 when the washer 3 is press fitted onto the shank 6 of the pin 2. The washer support surface 19 can be annular in shape and perpendicular or inclined to the axial direction. Thus, when the washer 3 is press fitted onto the shank 6 of the pin 2, the edge of the washer 3 defining the hole 13 is expanded over the outer surface of the shank 6 until the washer 3 contacts the component 5. The washer supporting surface 19 or a separate tool can be used to deform the conically shaped washer 3 such that it is flattened against the component 5.

Figure 9:
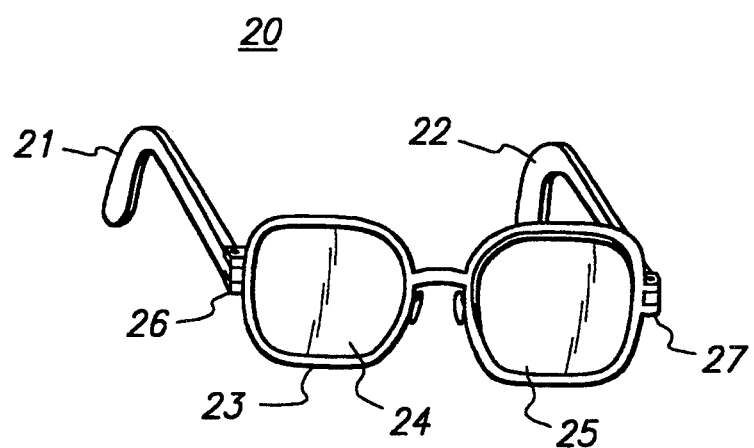
FIG. 9 shows an eyeglass frame in which the claimed fastener can be used.

The fastener according to the invention can be used to hold together the components of eyeglasses 20, shown in FIG. 9. Eyeglasses 20 comprise temples 21 and 22, and frame 23 supporting lens 24 and lens 25. Temples 21 and 22 are joined with frames 23 at hinges 26 and 27 by fasteners according to the invention.

The Ni-Ti material of the washer 3 may or may not include one or more alloying elements. In addition, the material of the washer 3 can optionally be subjected to heat treatment provided the material of the washer 3 retains some work hardening. In forming the conical shape of the washer 3, a flat washer 3, as shown in FIG. 6, can be placed in a die having a conical shape. Due to springback, the conical shape of the die should be more tapered than the desired conical shape of the washer 3. For instance, in order to obtain a taper of 15° to 20° in the final conical shape of the washer 3, the die can be provided with a taper of over 30° such as about 45°. Thus, when the washer 3 is pressed into the die, to form the conical shape upon release of the deforming force the washer 3 will spring back to a conical shape having the desired angle.

The pin 2 can be of any suitable material which provides an interference fit with the washer 3. For instance, the pin 2 can be of copper or a copper base alloy, steel such as stainless steel, German silver or other metal, ceramic or plastic material. The pin 2 and washer 3 can have various dimensions and shapes provided they can be assembled together to provide an interference fit.

For example, the pin 2 can include a shank 6 having an outer diameter of 0.053" and a radially outwardly extending flange 7 having an outer diameter of 0.073". The washer 3 can be conical in shape such that surfaces 14 of the washer 3 form an angle with a normal to the central axis of the hole 13 in the washer 3. In a flattened condition, the hole 13 in the washer 3 should be smaller than the outer diameter of the shank 6 of the pin 2. For example, if the shank 6 has an outer diameter of 0.053" the hole 13 can have a diameter of 0.049".

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A fastener comprising a pin and a belleville washer, the pin including a shank and the washer including a hole extending between opposite sides of the washer, the hole being sized to provide an interference fit with the shank and the washer being of a titanium-nickel shape memory alloy in an optimized elastic condition.

2. The fastener of claim 1, wherein the pin includes a flange extending radially outwardly from one end of the shank.

3. The fastener of claim 1, wherein the washer includes a conical surface extending between the hole and an outer periphery of the washer is inclined with respect to a central axis passing through the hole.

4. The fastener of claim 1, wherein the surface is inclined at an angle of at least 10° with respect to a normal to the central axis.

5. The fastener of claim 1, wherein the shank has a smooth outer surface.

6. The fastener of claim 1, wherein the shank has an irregular outer surface.

7. The fastener of claim 6, the irregular surface comprises a plurality of axially spaced-apart indentations extending circumferentially around the shank.

8. The fastener of claim 7, wherein the indentations are convex in axial cross section.

9. The fastener of claim 1, wherein the hole is circular and the shank is cylindrical, the hole having a diameter smaller than a maximum outer diameter of the shank.

10. The fastener of claim 1, wherein the shank of the pin extends through axially aligned bores in two discrete components of an eyeglass frame, the washer being press fitted on the shank and preventing the two components of the eyeglass frame from being removed from the pin.

11. The fastener of claim 1, wherein the shank of the pin extends through a bore in a component of an eyeglass frame, the washer being press fitted on the shank and preventing the component of the eyeglass frame from being removed from the pin.

12. The fastener of claim 1, wherein the shank has a free end which is tapered such that the shank becomes smaller in diameter in a direction towards the free end of the shank.

13. A method of attaching a fastener comprising a pin and a belleville washer, the pin including a shank and the washer including a hole extending between opposite sides of the washer, the hole being sized to provide an interference fit with the shank and the washer being of a titanium-nickel shape memory alloy in an optimized elastic condition, comprising steps of inserting the shank of the pin through a bore in a component and pressing the washer onto a free end of the shank such that the washer holds the shank of the pin in the bore of the component.

14. The method of claim 13, wherein the washer has a conical surface extending between the hole and an outer periphery of the washer, the washer being deformed during the pressing step such that the conical surface is substantially flattened and the flattened surface presses against the component.

15. The method of claim 13, wherein the component forms part of an eyeglass frame and the pin includes a radially outwardly extending flange, the method further including passing the shank through a bore of a second component of the eyeglass frame during the inserting step.

16. The method of claim 15, wherein the washer is pressed onto the shank until the flange presses against the second component.

* * * * *